(12) United States Patent
Kammer et al.

(10) Patent No.: US 6,363,082 B1
(45) Date of Patent: *Mar. 26, 2002

(54) TECHNIQUE FOR HANDLING UNDESIRED DATA OVER A LIMITED BANDWIDTH CHANNEL

(75) Inventors: David Kammer, Seattle; Steve Elliot, Renton; Rich Karstens, Lake Forest Park, all of WA (US)

(73) Assignee: Palm Computing, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/710,494

(22) Filed: Nov. 10, 2000

Related U.S. Application Data

(63) Continuation of application No. 09/454,250, filed on Dec. 2, 1999, now Pat. No. 6,222,857.

(51) Int. Cl.[7] .................................................. H04J 3/16
(52) U.S. Cl. ........................ 370/469; 370/310; 707/10; 455/557
(58) Field of Search ................................. 370/464, 465, 370/468, 469, 402, 401, 466, 489, 310, 467, 477; 709/245, 249; 707/10; 455/557, 550

(56) References Cited

U.S. PATENT DOCUMENTS

| 5,802,460 A | * | 9/1998 | Parvulesvu | ................. | 455/419 |
| 6,055,236 A | * | 4/2000 | Nessett | ........................ | 37/401 |
| 6,226,533 B1 | * | 5/2001 | Akahane | ..................... | 455/566 |

* cited by examiner

*Primary Examiner*—Douglas Olms
*Assistant Examiner*—Ricardo M. Pizarro
(74) *Attorney, Agent, or Firm*—Wagner, Murabito & Hao LLP

(57) ABSTRACT

A technique for handling undesired data over a limited bandwidth channel. Specifically, one embodiment in accordance with the present invention operates within an electronic system or device (e.g., personal digital assistant) which can be coupled to a networking environment. An embodiment of the present invention allows higher levels of software operating within an electronic system to directly communicate with and determine the current operation of lower levels of software. As such, a higher level of software is advantageously able to perform appropriate actions in response to activities being performed by a lower level of software. For example, the higher level of software is able to suspend its time-out of a delayed response to a data request after determining that the reason for the delay is due to the fact that there is a "log jam" caused by canceled data packets being processed by a transport layer while a UDP layer is currently discarding canceled data packets associated with a canceled data request. Therefore, one embodiment of the present invention enables electronic devices to operate more efficiently.

14 Claims, 5 Drawing Sheets

TECHNIQUE FOR HANDLING UNDESIRED DATA OVER A LIMITED BANDWIDTH CHANNEL

This is a continuation of application Ser. No. 09/454,250 filed on Dec. 2, 1999 now U.S. Pat. No. 6,222,857 which is hereby incorporated by reference to this specification.

TECHNICAL FIELD

The present invention generally relates to the field of electronic networking environments. More particularly, the present invention relates to the field of limited bandwidth communication within networking environments.

BACKGROUND ART

Computers and other electronic devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the internet provide their users access to data and information from all over the world.

It is appreciated that there are different types of electronic networking environments. One popular type of electronic networking environment is known as a local area network, typically referred to as a LAN. LANs connect multiple computer systems together such that the users of the computer systems have the ability to access the same information and share data. Additionally, another type of electronic networking environment is known as a wide area network, commonly referred to as a WAN. WANs also connect multiple computer systems together thereby enabling them to access and share the same data and information. But a WAN typically connects a much larger number of computer systems together compared to a LAN and typically the WAN also covers a more expansive amount of real estate (e.g., state, country, continent, etc.).

As mentioned above, several different types of electronic devices have the ability to be coupled to an electronic networking environment, such as a LAN or a WAN. For example, automated teller machines (ATMs) of commercial banks, desktop computer systems, credit card point of sale machines located within commercial stores and restaurants, portable (laptop) computer systems, computer navigation devices installed within automobiles, and personal digital assistants can all be coupled to electronic networking environments. It should be appreciated that some of the types of electronic devices which can be coupled to an electronic networking environment may have a very limited bandwidth within their respective communication channel.

For example, a personal digital assistant (commonly referred to as a PDA) can have a limited bandwidth within its communication channel when coupled to the internet by certain wireless communication links. It is appreciated that the personal digital assistant is a battery powered hand-held device that is used as an electronic organizer which has the capability to store a wide range of information that includes daily appointments, numerous telephone numbers of business and personal acquaintances, and various other information. Moreover, the personal digital assistant can also access information from the internet, as mentioned above. It should be appreciated that there are disadvantages associated with electronic devices (e.g., personal digital assistant) which have a limited bandwidth within their respective communication channel.

One of the disadvantages associated with electronic devices having limited bandwidth within their respective communication channel is that data requests may improperly time-out. For example, when a user of a limited bandwidth electronic device (e.g., personal digital assistant) cancels a previous request for data (such as a request for a web page) after the request has gone out from the device, typically a response to the requested data is returned to the requesting electronic device even though the request was canceled. In most situations, it is sufficient to simply ignore this returning canceled data since it is no longer relevant. However, on an electronic device having a limited bandwidth in its transport layer, this returning canceled data can fill up the available bandwidth of the communication channel thereby blocking or greatly delaying the response time of a current outstanding data request. To the higher level of software operating within the limited bandwidth electronic device, this large delay appears simply as if the network or server is being unresponsive to the current request for data, thereby resulting in the current request improperly timing-out causing the user inconvenience. This problem is particularly seen in systems that use very reliable but slow transport layers. In these systems, often a relatively uncomplicated (and inexpensive) universal datagram protocol (UDP) layer is used just below the port layer. The UDP layer does not have any communication complement for indicating its activity to higher level applications and it typically used to convey encoded audio/video information. When a UDP layer is dispensing with canceled data, often the application layer is totally unaware of this fact, causing improper data request time-outs as described above.

It should be appreciated that a request which improperly times-out can escalate the delay problem since the response to that requested data eventually returns to the limited bandwidth electronic device thereby further blocking or delaying its communication channel.

Therefore, one of the disadvantages associated with electronic devices having limited bandwidth within their respective communication channel is that data requests may improperly time-out. As such, during certain circumstances, limited bandwidth electronic devices can operate in an inefficient manner.

DISCLOSURE OF THE INVENTION

Accordingly, a need exists for a method and system for preventing an electronic device having limited bandwidth within its respective communication channel (e.g., transport layer) from improperly timing-out a data request. The present invention provides a method and system for preventing an electronic device having limited bandwidth within its respective communication channel from improperly timing-out a data request. Specifically, one embodiment in accordance with the present invention operates within an electronic system or device (e.g., personal digital assistant) which can be coupled to a networking environment. An embodiment of the present invention allows higher levels of software operating within an electronic system to directly communicate with and determine the current operation of lower levels of software. As such, a higher level of software is advantageously able to perform appropriate actions in response to activities being performed by a lower level of software. For example, the higher level of software is able to suspend its time-out of a delayed response to a data request after determining that the reason for the delay is due to the fact that there is a "log jam" caused by canceled data packets being processed by a transport layer while a UDP layer is currently discarding canceled data packets associated with a canceled data request. Therefore, one embodiment of the present invention enables electronic devices to operate more efficiently.

In another embodiment, the present invention includes an electronic system (e.g., personal digital assistant) having a processor, a bus and a memory unit. Furthermore, the electronic system further includes an application software layer. Additionally, the electronic system includes a port layer comprising a plurality of ports each for selective assignment to and communication with applications of the application software layer. Moreover, the electronic system includes a universal datagram protocol (UDP) layer coupled to communicate information with the port layer. It should be appreciated that the UDP layer reserves a space within the memory unit for storage of communication statistics. It should be further appreciated that the application software layer is for bypassing the port layer to directly access the communication statistics of the UDP layer. The electronic system also includes an internet protocol (IP) layer coupled to communicate information with the UDP layer. Furthermore, the electronic system includes a transport layer coupled to receive information and communicate the information to the IP layer.

In still another embodiment, the present invention includes an electronic system (e.g., personal digital assistant) having a processor, a bus and a memory unit, which performs a method of receiving a requested data packet. The method includes the step of an application of an application software layer generating data packet requests and selectively canceling a first data request for a first data packet. Additionally, the method includes the step of assigning a first port of a port layer to the first data request and subsequently canceling the first port assignment responsive to the first data request being canceled. Furthermore, the method includes the step of receiving the first data packet and forwarding the first data packet to a UDP layer. It should be appreciated that the previous step is performed by a transport layer and an IP layer communicatively coupled together. The method also includes the step of the UDP layer dumping the first data packet to a no-port designation in response to receiving the first data packet while the first port is canceled. In response to the previous step, the UDP layer updates a communication statistic. Additionally, the method includes the step of the application bypassing the port layer to directly access the communication statistic within the UDP layer and, based thereon, preventing improper time-out of a second data request that was issued subsequently to the first data request.

In yet another embodiment, the present invention includes an electronic system (e.g., personal digital assistant) having a processor, a bus and a memory unit. The electronic system further includes an application software layer comprising an application for generating data packet requests and for selectively canceling a first data request for a first data packet. Moreover, the electronic system includes a port layer comprising a plurality of ports each for selective assignment to and communication with the application. Additionally, the electronic system includes a UDP layer coupled to communicate data packets to the port layer. It is appreciated that the UDP layer reserves a space within the memory unit for storage of communication statistics and wherein the application is also for bypassing the port layer to directly access the communication statistics. The electronic system also includes an IP layer coupled to communicate data packets to the UDP layer. Furthermore, the electronic system includes a transport layer coupled to receive data packets and communicate the data packets to the IP layer.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
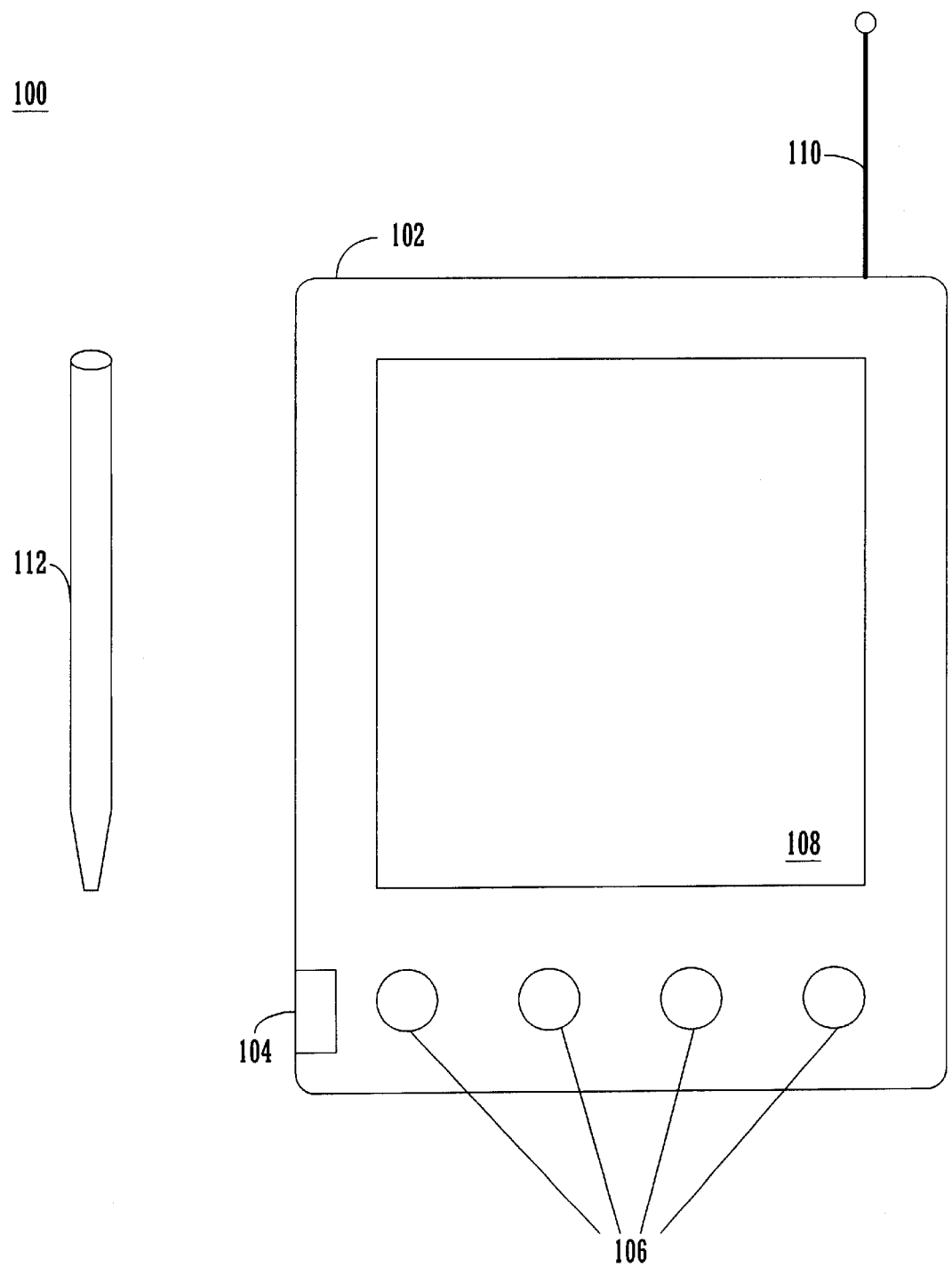
FIG. 1 is an exterior top view of an exemplary personal digital assistant system within which embodiments in accordance with the present invention may be implemented.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "preventing", "using" or the like, refer to the actions and processes of a computer system, or similar electronic computing device including a personal digital assistant (PDA). The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

ELECTRONIC SYSTEM ENVIRONMENT OF THE PRESENT INVENTION

One of the common types of electronic devices which can be used in accordance with one embodiment of the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the internet along with other internet capabilities. Moreover, an advanced personal digital assistant can have internet capabilities over a wireless communication interface (e.g., radio interface). One embodiment in accordance with the present invention operates within a personal digital assistant which is communicatively coupled to a networking environment. It should be appreciated that embodiments of the present invention are well suited to operate within a wide variety of electronic systems (e.g., computer systems) which are communicatively coupled to a networking environment.

With reference now to FIG. 1, which is an exterior top view of an exemplary personal digital assistant system 100 or "platform" within which embodiments of the present invention may be implemented. Personal digital assistant system 100 includes a stylus 112 along with a personal digital assistant 102 which further includes a plurality of function buttons 106, an on/off button 104, a touch screen 108, and an antenna 110. It should be appreciated that an operator of personal digital assistant 102 is able to turn it on and off by using on/off button 104. Moreover, the operator is able to control specific functionality of personal digital assistant 102 by using its plurality of function buttons 106 (e.g., to invoke telephone/address data, calendar data, to-do-list data, and memo pad data). Furthermore, the operator can utilize stylus 112 in conjunction with touch screen display 108 in order to cause personal digital assistant 102 to perform a multitude of different functions. One such function is the selecting of different functional operations of personal digital assistant 102, which are accomplished by touching stylus 112 to specific areas of touch screen 108. Another such function is the entering of data into personal digital assistant 102. For example, data is typically entered by simply writing with stylus 112 across touch screen 108 of personal digital assistant 102. Additionally, antenna 110 enables personal digital assistant 102 to be communicatively coupled to a network environment (not shown) thereby enabling its operator to communicate information with other computer systems and electronic devices coupled to the network.

Figure 2:
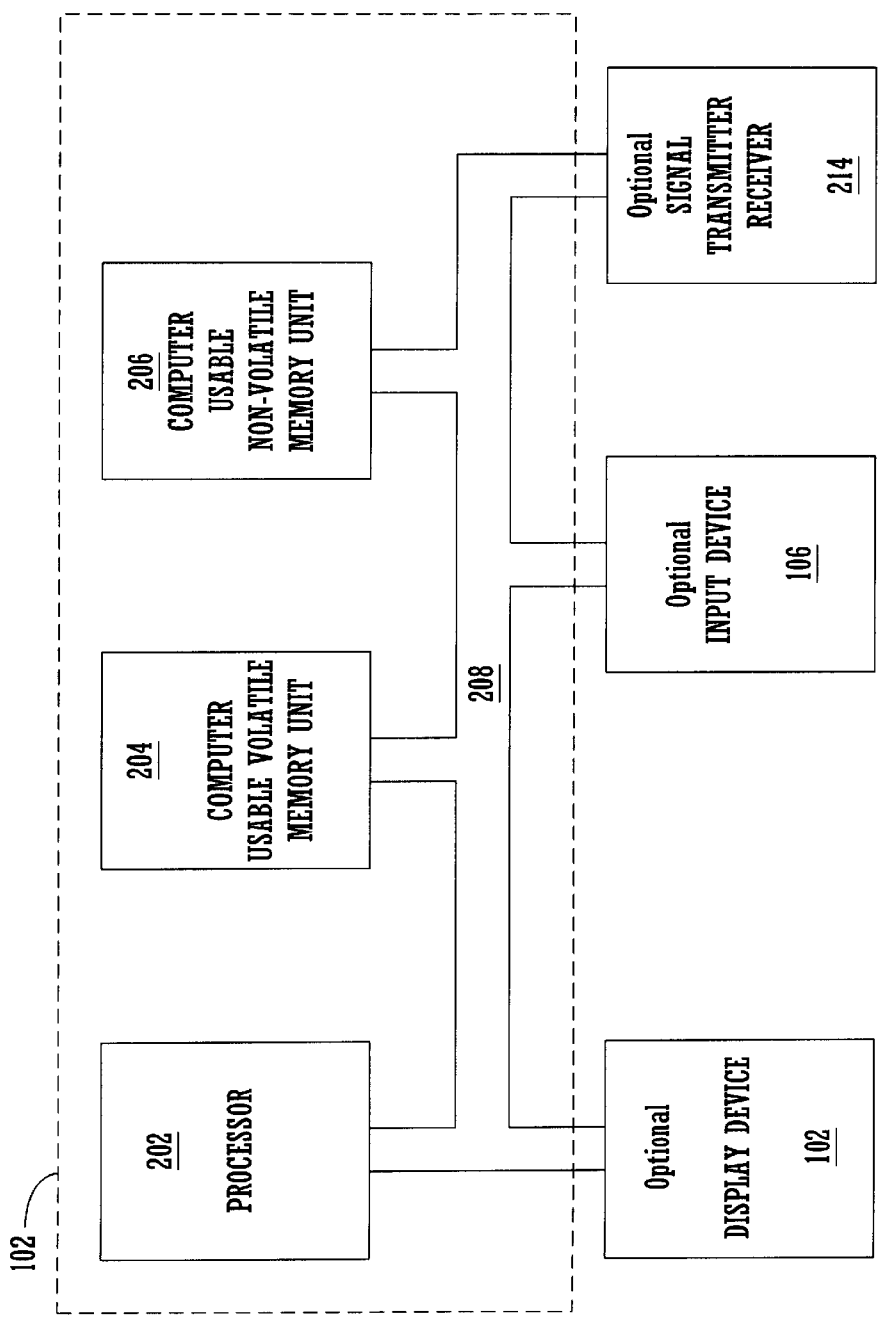
FIG. 2 is a block diagram of interior components of the personal digital assistant of FIG. 1 upon which embodiments of the present invention may be implemented.

Referring now to FIG. 2, portions of the present method and system are comprised of computer-readable and computer-executable instructions which reside, for example, in computer-usable media of an electronic system (e.g., personal digital assistant, computer system, and the like). FIG. 2 is a block diagram of exemplary interior components of personal digital assistant 102 (FIG. 1) upon which embodiments of the present invention may be implemented. It is appreciated that personal digital assistant 102 of FIG. 2 is only exemplary and that the present invention can operate within a number of different electronic systems including general purpose networked computer systems, embedded computer systems, and stand alone electronic systems.

Personal digital assistant 102 of FIG. 2 includes an address/data bus 208 for communicating information, and a central processor unit 202 coupled to bus 208 for processing information and instructions. It should be appreciated that central processor unit 202 may be any other type of processor. Personal digital assistant 102 also includes data storage features such as a computer usable volatile memory 204 (e.g., random access memory, static RAM, dynamic RAM, etc.) coupled to bus 208 for storing information and instructions for central processor unit 202, computer usable non-volatile memory 206 (e.g., read only memory, programmable ROM, flash memory, EPROM, EEPROM, etc.) coupled to bus 208 for storing static information and instructions for the central processor unit 202. Personal digital assistant 102 of the present embodiment also includes an optional input device 106, which includes function buttons and a touch screen, that is coupled to bus 208 for communicating information and command selections to central processor unit 202. Personal digital assistant 102 also includes an optional display device 102, previously described, which is coupled to bus 208 for displaying information. It should be appreciated that optional display device 102 may be a flat panel liquid crystal display (LED) screen, field emission display (FED) screen, or other display device suitable for creating graphic images and alphanumeric characters recognizable to a user.

With reference still to FIG. 2, personal digital assistant 102 also includes a signal transmitter receiver device 214 which is coupled to bus 208 for providing a physical communication link between personal digital assistant 102 and a network environment (not shown). As such, signal transmitter receiver device 214 enables central processor unit 202 to communicate wirelessly with other electronic systems coupled to the network. It should be appreciated that within the present embodiment, signal transmitter receiver device 214 is coupled to antenna 110 (not shown) and provides the functionality to transmit and receive information over a wireless communication interface. It should be further appreciated that the present embodiment of signal transmitter receiver device 214 is well suited to be implemented in a wide variety of ways. For example, signal transmitter receiver device 214 could be implemented as a modem.

Figure 3:
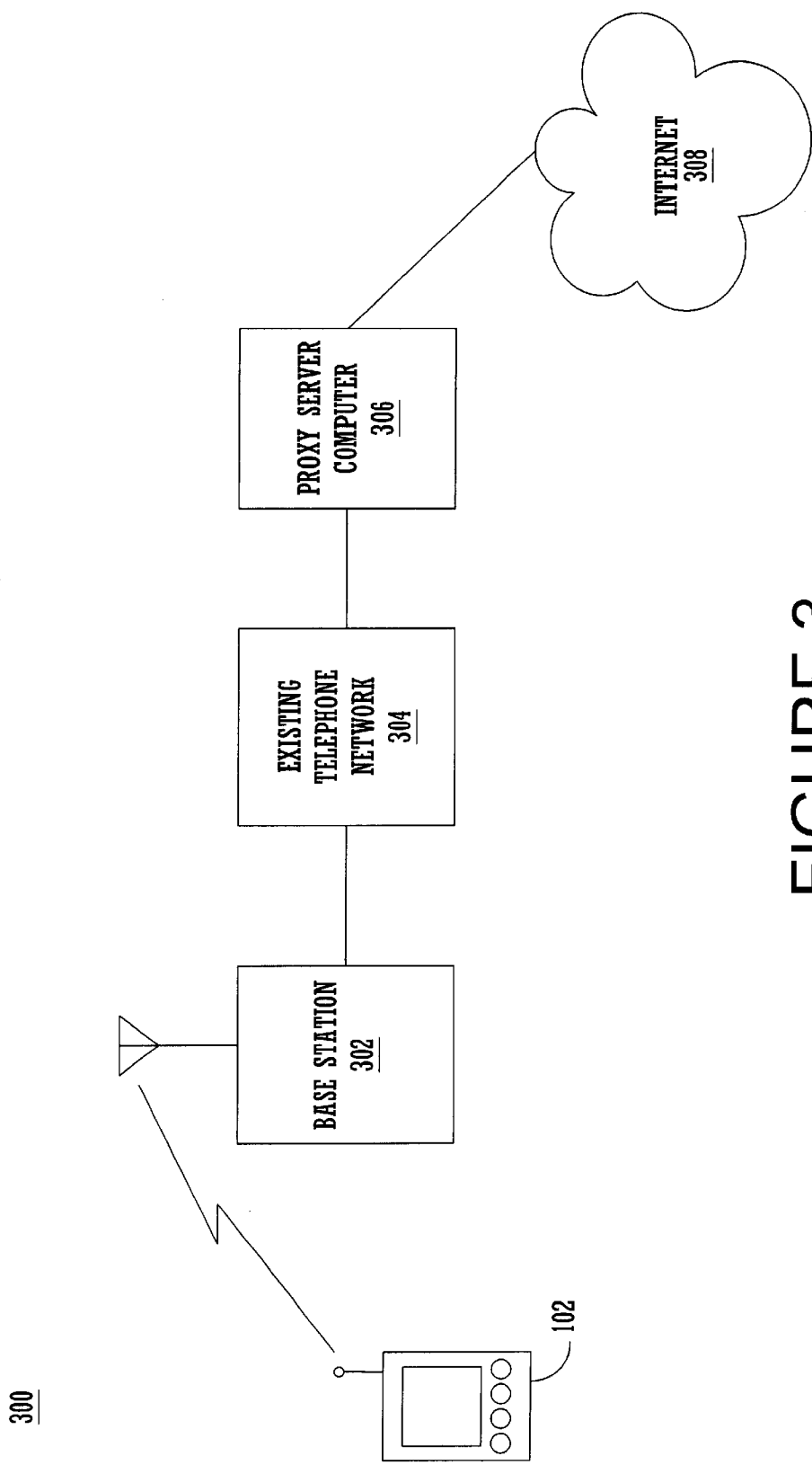
FIG. 3 is a block diagram of an exemplary network environment in accordance with one embodiment of the present invention which includes the personal digital assistant of FIG. 1.

Referring now to FIG. 3, which is a block diagram of an exemplary network environment 300 in accordance with one embodiment of the present invention which includes personal digital assistant 102 (FIG. 1). As previously mentioned, personal digital assistant 102 has the ability to transmit and receive data and information over a wireless communication interface (e.g., radio interface). Base station 302 is a transmitter and receiver base station which can be implemented by coupling it into an existing public telephone network 304. Implemented in this manner, base station 302 enables personal digital assistant 102 to communicate with a proxy server computer system 306, which is coupled by wire to the existing public telephone network 304. Furthermore, proxy server computer system 306 is coupled to the internet 308, thereby enabling personal digital assistant 102 to communicate with the internet 308. It should be appreciated that within the present embodiment, one of the functions of proxy server 306 is to perform operations over the internet 308 on behalf of personal digital assistant 102. For example, proxy server 306 has a particular internet address and it acts as a proxy device for personal digital assistant 102 over the internet 308. The data and information which is communicated between base station 302 and personal digital assistant 102 is the same type of information and data that can conventionally be transferred and received over a public telephone wire network system. However, a wireless communication interface is utilized to communicate data and information between personal digital assistant 102 and base station 302. It should be appreciated that one embodiment of a wireless communication system in accordance with the present invention is the Mobitex wireless communication system, which is a very reliable system.

Figure 4:
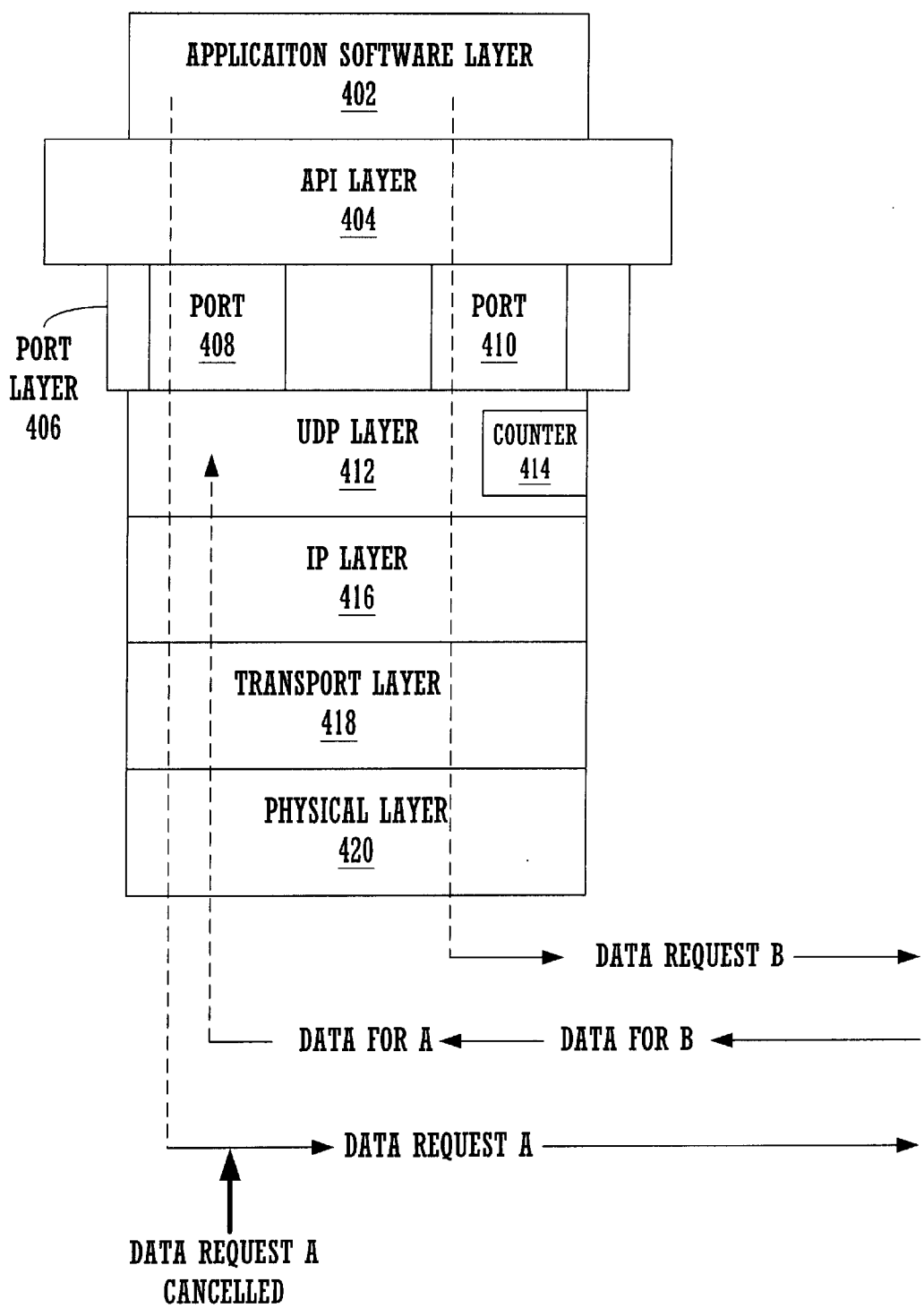
FIG. 4 is a block diagram of an exemplary protocol stack operating within the personal digital assistant of FIG. 1 in accordance with one embodiment of the present invention.

With reference to FIG. 4, which is a block diagram of an exemplary protocol stack 400 operating within personal digital assistant 102 in accordance with one embodiment of the present invention. It should be appreciated that protocol stack 400 enables communication between different electronic components and devices located within and outside of personal digital assistant 102. Additionally, protocol stack 400 is made up of several different protocol layers. That is, protocol stack 400 includes an application software layer 402, which includes many different software applications that operate within personal digital assistant 102; The application software layer 402 is coupled to communicate data, data packets, and other types of information with an optional advanced programming interface (API) layer 404. It is appreciated that an API layer is well known by those of ordinary skill in the art. Furthermore, the API layer 404 is disposed between application software layer 402 and a port layer 406, which includes multiple ports (e.g., 408 and 410) each for selective assignment to and communication with applications of the application software layer 402.

Moreover, protocol stack 400 also includes a universal datagram protocol (UDP) layer 412 which is coupled to communicate information with port layer 406. Within the present embodiment, UDP layer 412 is implemented to include software code (e.g., counter 414) which keeps track of communication statistics. For example, counter 414 of the present embodiment can be directly read by the application software layer 402 and it keeps track of occurrences of no-port-dumps within UDP layer 412. As such, UDP layer 412 updates counter 414 upon receiving and processing a canceled data packet (e.g., UDP data packet) which is destined for a port (e.g., 408) that is no longer assigned. It should be appreciated that the canceled data packet is associated with a canceled data request.

With reference still to FIG. 4, protocol stack 400 also includes an internet protocol (IP) layer 416 which is coupled to communicate data packets and information with UDP layer 412. It is appreciated that an IP layer is well known by those of ordinary skill in the art. Additionally, protocol stack 400 also includes a transport layer 418 which is coupled to receive data packets and information and communicate such with IP layer 416 and a physical layer 420. It should be appreciated that transport layer 418 can be implemented in a variety of ways in accordance with the present embodiment. For example, transport layer 418 can be implemented such that it is compliant with the Mobitex wireless communication system. Furthermore, transport layer 418 can also be implemented such that it is compliant with the Ethernet network. Protocol stack 400 of the present embodiment also includes physical layer 420 which is coupled to transport layer 418 in order to communicate data packets and information. It should be appreciated physical layer 420 of the present embodiment is well suited to be coupled in a variety of ways. For example, physical layer 420 can be coupled to terrestrial phone lines (e.g., existing telephone network 304) or coupled to a wireless transmitter receiver component.

Within the present embodiment of protocol stack 400, it should be appreciated that in response to a software application within application software layer 402 generating a data request, a port (e.g., 408) of port layer 406 is assigned to and communicates with that particular software application and acts as an interface between the software application and lower communication layers. Furthermore, if that software application subsequently cancels that data request, the port is also canceled and is no longer assigned to that particular software application. Therefore, since there is no assigned port for the returning canceled data, the UDP layer 412 performs a no-port-dump of that canceled data when it arrives at the UDP layer 412.

In order to more fully describe the operation of protocol stack 400 of FIG. 4, a description of an example follows. Given a software application generates a data request A, which includes a large amount of data (e.g., a web page). The generation of data request A causes port 408 to be assigned to that software application. As such, data request A passes through API layer 404, port 408, UDP layer 412, IP layer 416, transport layer 418, physical layer 420 and is eventually output by personal digital assistant 102. Subsequently, the software application cancels data request A and then generates data request B causing port 410 to be assigned to the software application. Subsequently, data request B passes through API layer 404, port 410, UDP layer 412, IP layer 416, transport layer 418, physical layer 420 and is eventually output by personal digital assistant 102.

It should be appreciated that even though data request A was canceled after it was output by personal digital assistant 102, typically a response to data request A is still returned to personal digital assistant 102. As such, data for A subsequently returns to personal digital assistant 102 and passes through physical layer 420, transport layer 418, IP layer 416, and into UDP layer 412. In response to receiving data for A, UDP layer 412 performs a no-port-dump of the data for A because port 408 is no longer assigned to the software application. Concurrently, data for B returns to personal digital assistant 102 and passes through physical layer 420 and into transport layer 418. It is important to mention that some embodiments of transport layer 418 (e.g., Mobitex) are very reliable but have a limited bandwidth channel and as such, process data slower than other embodiments of transport layer 418. Given that situation, the data for B is unable to pass through transport layer 418 because transport layer 418 is busy processing the data for A (assuming the data for A is relatively lengthy). That is, the data for B is unable to pass through transport layer 418 until the data for A has first passed through transport layer 418. Therefore, the unwanted data for A can greatly delay or block the desired data for B from eventually reaching the software application. In other words, the data for A creates a "log jam" for the data for B within the communication channel of the transport layer 418. Consequently, this log jam of the data for B can subsequently result in the software application improperly timing-out data request B because the software application believes the server holding data for B is non-response. One embodiment in accordance with the present invention is able to prevent the software application from improperly timing-out data request B.

DETAILED DESCRIPTION OF THE OPERATION OF THE PRESENT INVENTION

Figure 5:
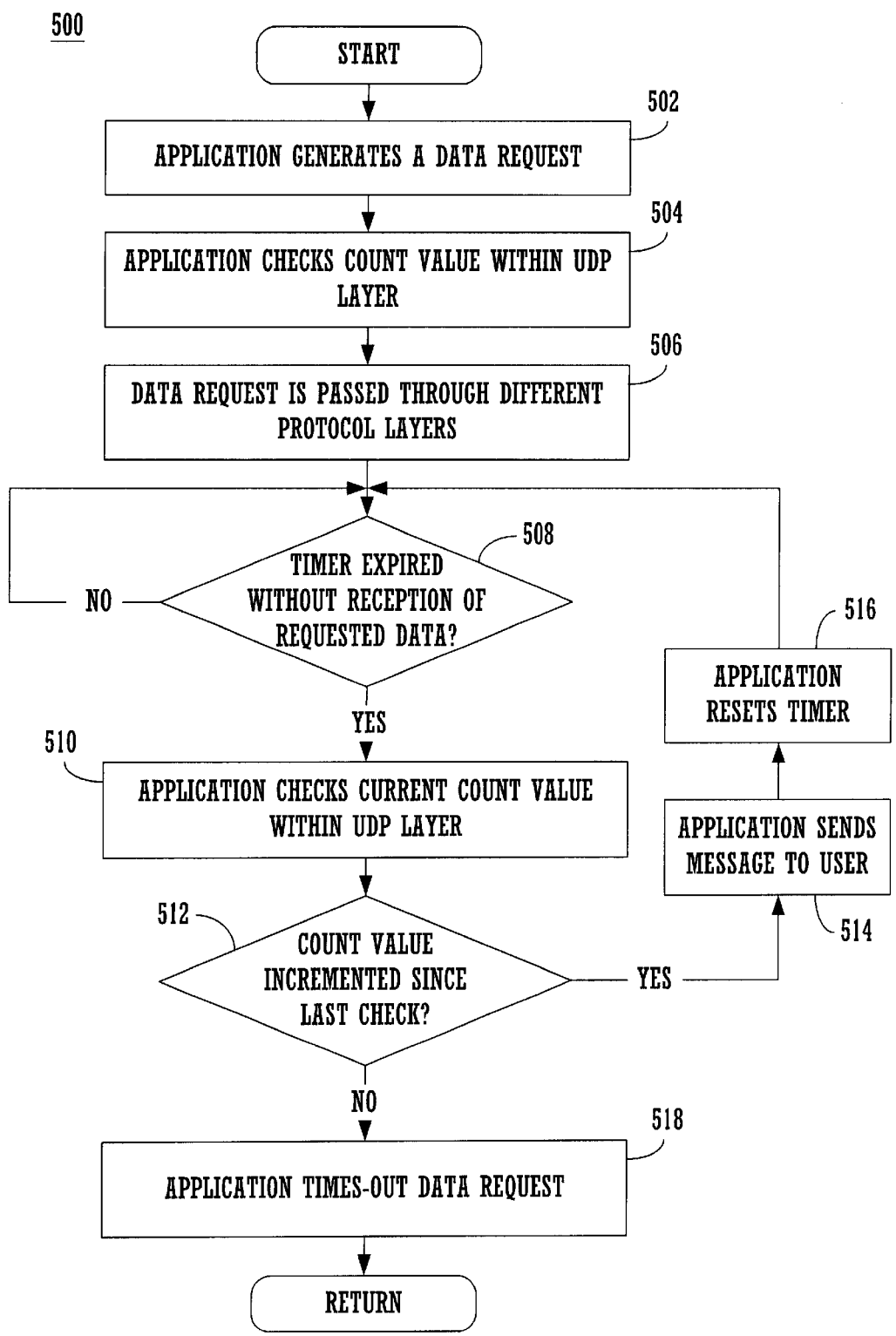
FIG. 5 is a flowchart of steps performed in accordance with one embodiment of the present invention for enabling a higher level of software to directly determine the current operation of a lower level of software operating within an electronic system.

Referring now to FIG. 5, which is a flowchart 500 of steps performed in accordance with one embodiment of the present invention for enabling a higher level of software to determine the operation of a lower level of software operating within an electronic system (e.g., personal digital assistant 102) to avoid improper time-outs of data requests. Flowchart 500 includes processes of the present invention which, in one embodiment, are carried out by a processor and electrical components under the control of computer readable and computer executable instructions. The computer readable and computer executable instructions reside, for example, in data storage features such as computer usable volatile memory 204 and/or computer usable non-volatile memory 206 of FIG. 2. Although specific steps are disclosed in flowchart 500, such steps are exemplary. That is, the present invention is well suited to performing various other steps or variations of the steps recited in FIG. 5.

The general idea of the present embodiment of flowchart 500 is to enable a higher level of software (e.g., software application) operating within an electronic system (e.g., personal digital assistant 102) to perform appropriate actions in response to activities being performed by a lower level of software, e.g., a universal datagram protocol (UDP) layer. More specifically, the software application of the present embodiment is able to suspend its time-out of a delayed response to a data request after determining that the reason for the delay is due to the fact that there is a "log jam" caused by canceled data packets being processed by a transport layer while a UDP layer is currently discarding canceled data packets associated with a previously issued data request that was subsequently canceled. As such, the present embodiment enables electronic systems to operate more efficiently.

It should be appreciated that flowchart 500 is described in conjunction with FIGS. 1–4 in order to more fully describe the operation of the present embodiment. In step 502 of FIG. 5, a software application of the present embodiment operating within personal digital assistant 102 generates a data request (e.g., internet web page request). It is appreciated that the software application of the present embodiment is located within application software layer 402 (FIG. 4). At step 504, the software application of the present embodiment retrieves the current count value located within counter 414 of UDP layer 412. As mentioned above, the count value stored within counter 414 represents the amount of occurrences of no-port-dumps within UDP layer 412. Additionally, UDP layer 412 updates the value stored within counter 414 upon receiving and processing a canceled data packet (e.g., UDP data packet) that is destined for a port which is no longer assigned. Moreover, the canceled data packet is associated with a canceled data request. It is important to note that the software application performs step 504 by bypassing port layer 406 in order to directly access the count value stored within counter 414 from UDP layer 412.

In step 506, the internet web page request issued by the software application is passed through the different protocol layers of protocol stack 400 (FIG. 4) which exist within personal digital assistant 102. That is, at step 506, the internet web page request passes through API layer 404 and causes port 408 to be assigned to and communicate with the software application. Additionally, at step 506, the internet web page request subsequently passes through port 408 and through UDP layer 412, IP layer 416, transport layer 418 and onto physical layer 420. It should be appreciated that once the internet web page request (or any other type of data request) has been output by personal digital assistant 102, typically a response to the data requested is returned to personal digital assistant 102 (even though the data request was canceled). At step 506, personal digital assistant 102 transmits the internet web page request to base station 302 (FIG. 3), which transmits it through the existing public telephone network 304 to proxy server computer system 306. Moreover, at step 506, proxy server 306 transmits the internet web page request to the internet 308. It should be appreciated that the response to the internet web page request travels from the internet 308 to the software application operating within personal digital assistant 102 through the same described path, but in reverse order.

At step 508 of FIG. 5, the software application of the present embodiment determines whether the time-out timer has expired without the software application receiving the response to the internet web page request. In step 508, if the time-out timer has not expired without the software application receiving the response to the internet web page request, the present embodiment proceeds to the beginning of step 508. If the time-out timer has expired without the software application receiving the response to the internet web page request at step 508, the present embodiment proceeds to step 510.

In step 510, the software application of the present embodiment retrieves the current count value stored within counter 414 by UDP layer 412. It is important to note that the software application performs step 510 by bypassing port layer 406 in order to directly access the count value stored within counter 414 from UDP layer 412. At step 512, the software application of the present embodiment determines whether the count value has been incremented since the last time it retrieved a count value from counter 414. In step 512, if the present embodiment determines that the count value has not been incremented since the last time the software application retrieved a count value from counter 414, the present embodiment proceeds to step 518. At step 512, if the present embodiment determines that the count value has been incremented since the last time the software application retrieved a count value from counter 414, the present embodiment proceeds to step 514. It should be appreciated that UDP layer 412 of the present embodiment increases the count value stored within counter 414 while performing no-port-dumps of canceled data packets. Therefore, if the count value stored within counter 414 has increased, UDP layer 412 is currently dumping or discarding canceled data packets.

In step 514 of FIG. 5, the software application of the present embodiment sends a message to the user of personal digital assistant 102 that the data request will be completed momentarily. At step 516, the software application of the present embodiment resets the time-out timer for the internet web page request. After completing step 516, the present embodiment proceeds to the beginning of step 508. In step 518, the software application of the present application times-out the internet web page request since the internet 308 or proxy server 306 (or any combination of elements of network 300) is being unresponsive to its request.

Thus, one embodiment of the present invention provides a method and system for preventing an electronic device having limited bandwidth within its communication channel from improperly timing-out a data request.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An electronic system having a processor, a bus and a memory unit and further comprising:
   an application software layer;
   a port layer comprising a plurality of ports each for selective assignment to applications of said application software layer and communication with said applications;
   a universal datagram protocol (UDP) layer coupled to communicate information with said port layer, said UDP layer reserving a space within said memory unit for storage of communication statistics and wherein said application software layer is for bypassing said port layer to directly access said communication statistics of said UDP layer;
   an internet protocol (IP) layer coupled to communicate information with said UDP layer; and
   a transport layer coupled to receive information and communicate said information to said IP layer.

2. An electronic system as described in claim 1 wherein said transport layer is compliant with the Mobitex wireless communication system.

3. An electronic system as described in claim 1 wherein said transport layer is compliant with the Ethernet network.

4. An electronic system as described in claim 1 wherein said transport layer utilizes a terrestrial phone line.

5. An electronic system as described in claim 1 wherein said electronic system is a personal digital assistant (PDA) platform.

6. An electronic system having a processor, a bus and a memory unit and further comprising:
   an application software layer comprising an application for generating data packet requests and for selectively canceling a first data request for a first data packet;
   a port layer comprising a plurality of ports each for selective assignment to said and communication with said application;
   a universal datagram protocol (UDP) layer coupled to communicate data packets to said port layer, said UDP layer reserving a space within said memory unit for storage of communication statistics and wherein said application is also for bypassing said port layer to directly access said communication statistics;
   an internet protocol (IP) layer coupled to communicate data packets to said UDP layer; and
   a transport layer coupled to receive data packets and communicate said data packets to said IP layer.

7. An electronic system as described in claim 6 wherein said transport layer is compliant with the Mobitex wireless communication system.

8. An electronic system as described in claim 6 wherein said transport layer is compliant with the Ethernet network.

9. An electronic system as described in claim 6 wherein said transport layer utilizes a terrestrial phone line.

10. An electronic system as described in claim 6 wherein said electronic system is a personal digital assistant (PDA) platform.

11. An electronic system having a processor, a bus and a memory unit, performs a method of receiving a requested data packet comprising the steps of:
   a) an application of an application software layer generating data packet requests and selectively canceling a first data request for a first data packet;
   b) assigning a first port of a port layer to said first data request and subsequently canceling said first port assignment responsive to said first data request being canceled;
   c) receiving said first data packet and forwarding said first data packet to a universal datagram protocol (UDP) layer, said step c) performed by a transport layer and an internet protocol (IP) layer communicatively coupled together;
   d) said universal datagram protocol (UDP) layer dumping said first data packet to a no-port designation in response to receiving said first data packet while said first port is canceled, said UDP layer updating a communication statistic in response to step d); and
   e) said application bypassing said port layer to directly access said communication statistic within said UDP layer and, based thereon, preventing improper time-out of a second data request that was issued subsequently to said first data request.

12. A method as described in claim 11 wherein said transport layer is compliant with the Mobitex wireless communication system.

13. A method as described in claim 11 wherein said electronic system is a personal digital assistant (PDA) platform.

14. A method as described in claim 11 wherein said communication statistics represent occurrences of no-port-dumps within said UDP layer.

* * * * *